(12) United States Patent     (10) Patent No.: US 12,267,590 B1
Ning et al.     (45) Date of Patent: Apr. 1, 2025

(54) SMART DOG AND SUBSTATION INSPECTION DEVICE

(71) Applicant: DONGGUAN POWER BUREAU OF GUANGDONG POWER GRID CO., LTD., Dongguan (CN)

(72) Inventors: Xuefeng Ning, Dongguan (CN); Yi Rao, Dongguan (CN); Dexing Sun, Dongguan (CN); Wanwei Wang, Dongguan (CN); Guanke Liu, Dongguan (CN); Xiliang Dai, Dongguan (CN); Rongfu Zhong, Dongguan (CN); Zhiqiang Lin, Dongguan (CN); Wei Wei, Dongguan (CN); Zehuai Liu, Dongguan (CN); Zhantu Yuan, Dongguan (CN); Long Li, Dongguan (CN); Yuanjia Li, Dongguan (CN); Chuanming Tan, Dongguan (CN); Yongyuan Wang, Dongguan (CN); Dawei Lu, Dongguan (CN); Libin Qin, Dongguan (CN); Wenrui Chen, Dongguan (CN); Haipeng Zhang, Dongguan (CN)

(73) Assignee: DONGGUAN POWER BUREAU OF GUANGDONG POWER GRID CO., LTD., Dongguan (CN)

( * ) Notice: Subject to any disclaimer, the term of this patent is extended or adjusted under 35 U.S.C. 154(b) by 0 days.

(21) Appl. No.: 18/864,995

(22) PCT Filed: Jul. 31, 2024

(86) PCT No.: PCT/CN2024/108819
§ 371 (c)(1),
(2) Date: Nov. 12, 2024

(87) PCT Pub. No.: WO2025/031229
PCT Pub. Date: Feb. 13, 2025

(51) Int. Cl.
*H04N 23/68* (2023.01)
*F16F 15/067* (2006.01)
(Continued)

(52) U.S. Cl.
CPC ......... *H04N 23/685* (2023.01); *F16F 15/067* (2013.01); *G03B 17/56* (2013.01);
(Continued)

(58) Field of Classification Search
CPC ........ H04N 23/23; H04N 23/51; G03B 40/00; G03B 17/56; F16F 15/067; H02B 3/00
See application file for complete search history.

(56) References Cited

U.S. PATENT DOCUMENTS

| 9,280,038 | B1 * | 3/2016 | Pan .......................... A45F 5/10 |
| 2018/0035606 | A1 * | 2/2018 | Burdoucci ........... A01D 34/008 |

(Continued)

FOREIGN PATENT DOCUMENTS

| CN | 115835002 | A | 3/2023 |
| CN | 115953856 | A | 4/2023 |

(Continued)

OTHER PUBLICATIONS

1st Chinese Office Action for CN 202310981623.0 dated Sep. 9, 2023, 5 pages (English translation—5 pages).
(Continued)

*Primary Examiner* — Amy R Hsu
(74) *Attorney, Agent, or Firm* — CM Law; Stephen J. Weed

(57) ABSTRACT

A substation inspection device includes a rack, an anti-vibration mechanism, a camera apparatus and a lock-stop apparatus. The anti-vibration mechanism is mounted on the rack. The camera apparatus includes a first mounting seat and a camera assembly. The first mounting seat is mounted on the rack through the anti-vibration mechanism. The
(Continued)

camera assembly is mounted on the first mounting seat. The lock-stop apparatus is mounted on the rack and is configured to fix the camera apparatus.

12 Claims, 8 Drawing Sheets

(51) Int. Cl.
  *G03B 17/56* (2021.01)
  *G03B 30/00* (2021.01)
  *H02B 3/00* (2006.01)
  *H04N 23/51* (2023.01)
(52) U.S. Cl.
  CPC .............. *G03B 30/00* (2021.01); *H02B 3/00* (2013.01); *H04N 23/51* (2023.01)

(56) References Cited

U.S. PATENT DOCUMENTS

| | | | |
|---|---|---|---|
| 2018/0302538 A1* | 10/2018 | Chen | G03B 19/22 |
| 2019/0020792 A1* | 1/2019 | Franz | H04N 23/52 |
| 2021/0157313 A1* | 5/2021 | Graf | B62D 53/02 |
| 2023/0353861 A1* | 11/2023 | Nordquist | H04N 23/695 |

FOREIGN PATENT DOCUMENTS

| | | |
|---|---|---|
| CN | 116330356 A | 6/2023 |
| CN | 116347204 A | 6/2023 |
| CN | 116709027 A | 9/2023 |

OTHER PUBLICATIONS

International Search Report for PCT/CN2024/108819 dated Sep. 13, 2024, 2 pages (English translation—3 pages).

* cited by examiner

SMART DOG AND SUBSTATION INSPECTION DEVICE

CROSS-REFERENCE TO RELATED APPLICATIONS

This is a national stage application filed under 35 U.S.C. 371 based on International Patent Application No. PCT/CN2024/108819, filed on Jul. 31, 2024, which claims priority to Chinese Patent Application No. 202310981623.0, filed with the China National Intellectual Property Administration (CNIPA) on Aug. 7, 2023, the disclosures of which are incorporated herein by reference in their entireties.

TECHNICAL FIELD

The present application relates to the technical field of inspection devices, for example, to a smart dog and a substation inspection device.

BACKGROUND

Nowadays, people's life is increasingly inseparable from electric power. The electric power needs to be processed by a substation before being supplied to users, and therefore the stable operation of the substation is particularly important. For this reason, the timely inspection of the substation is required; however, the manual inspection is time-consuming and inefficient. Nowadays, an inspection device is usually used for the automatic inspection, and the inspection device usually performs the inspection work by comparing shot images. However, the camera apparatus of the inspection device is relatively fine and is easy to damage during use, whereby the maintenance cost is relatively high.

The Chinese patent application CN115539781A discloses an intelligent inspection device for a power device with a protective structure, the intelligent inspection device is provided with an anti-collision mechanism to weaken the damage to an inspection robot when the inspection robot collides with an object, which is conducive to reducing the loss and prolonging the service life of the inspection robot. A retraction and extension mechanism of an inspection camera is provided, so that the inspection camera can be retracted into a cart body when the inspection robot does not work or charge. In this way, the unnecessary damage caused by external factors is prevented, and the working quality of the inspection robot is improved, avoiding the unnecessary maintenance of the inspection robot, and prolonging the service life of the inspection robot. When an impact force is too large, the anti-collision mechanism may make the retraction and extension mechanism to perform a retraction movement by means of a linkage mechanism while performing the buffering, so that a camera assembly is retracted into the cart body. In this way, the damage to the camera assembly due to the too large impact force is reduced, and it is conducive to minimizing the damage to the camera assembly in case of accidents.

However, when the inspection device encounters an obstacle, the camera is protected only by means of the anti-collision mechanism, but the impact cannot be buffered; therefore, the camera is still easily damaged due to the influence of vibrations.

SUMMARY

The present application provides a smart dog and a substation inspection device thereof, so that a problem that a camera module of the inspection device is easy to damage due to vibration is solved through a mechanical dog, an anti-vibration mechanism, a camera apparatus and a lock-stop apparatus.

The present application provides a substation inspection device with the vibration-proof performance. The substation inspection device includes a rack, an anti-vibration mechanism, a camera apparatus and a lock-stop apparatus. The anti-vibration mechanism is mounted on the rack, the camera apparatus includes a first mounting seat and a camera assembly, the first mounting seat is mounted on the rack through the anti-vibration mechanism, the camera assembly is mounted on the first mounting seat, and the lock-stop apparatus is mounted on the rack and is configured to fix the camera apparatus.

In one or more embodiments, the anti-vibration mechanism includes a first buffer assembly, and the first buffer assembly includes a bracket, extension plates and first elastic members. The bracket is slidably mounted on the rack. The first mounting seat is mounted on the bracket. Two extension plates are provided and are mounted on two sides of the bracket, respectively. Two first elastic members are provided, and two ends of each of the two first elastic members are connected to the rack and a respective one of the two extension plates.

In one or more embodiments, the anti-vibration mechanism further includes a second buffer assembly, and the second buffer assembly includes a guide rail, a sliding seat, a right-angle pedestal and a second elastic member. The guide rail and the right-angle pedestal are mounted on the rack. The sliding seat is slidably mounted on the guide rail. Two ends of each of the two first elastic members are connected to the sliding seat and a respective one of the two extension plates, respectively. And two ends of the second elastic member are connected to the bracket and the right-angle pedestal, respectively.

In one or more embodiments, the anti-vibration mechanism further includes a third buffer assembly, and the third buffer assembly includes a sliding frame, a sliding rail and a third elastic member. The sliding frame is mounted on the bracket, the sliding rail is disposed on the sliding frame, the first mounting seat is slidably mounted on the sliding rail, and two ends of the third elastic member are connected to the first mounting seat and the sliding frame, respectively.

In one or more embodiments, the lock-stop apparatus includes a second mounting seat, a locking block, a docking plate and a control assembly. The second mounting seat is mounted on the rack, the locking block is slidably mounted on the second mounting seat, a fourth elastic member is mounted on the locking block, and two ends of the fourth elastic member are connected to the locking block and the second mounting seat, respectively. The docking plate is mounted on the bracket, the docking plate is provided with at least two locking grooves fitted with the locking block, and the at least two locking grooves are arranged in an array. The control assembly is mounted on the rack and is configured to control the locking block to move.

In one or more embodiments, the control assembly includes a linear driver and a pushing block. The pushing block is slidably mounted on the second mounting seat and is tightly fitted with the locking block. The linear driver is mounted on the second mounting seat. And a drive end of the linear driver is in transmission connection with the pushing block.

In one or more embodiments, the camera apparatus further includes a lifting assembly, and the lifting assembly includes a rotation driver, a screw rod and a bevel gear. The rotation driver is mounted on the bracket. The screw rod is rotatably mounted on the bracket, and the screw rod is in a threaded connection with the sliding frame. Two bevel gears are provided, the two bevel gears are sleeved on the screw rod and a drive end of the rotation driver, respectively, and the two bevel gears are in a transmission connection.

In one or more embodiments, the right-angle pedestal is provided with a reinforcement rib.

In one or more embodiments, the rack is mounted with an inertial sensor.

The present application further provides a smart dog. The smart dog includes a mechanical dog. The mechanical dog is mounted with the substation inspection device.

REFERENCE LIST

Figure 1:
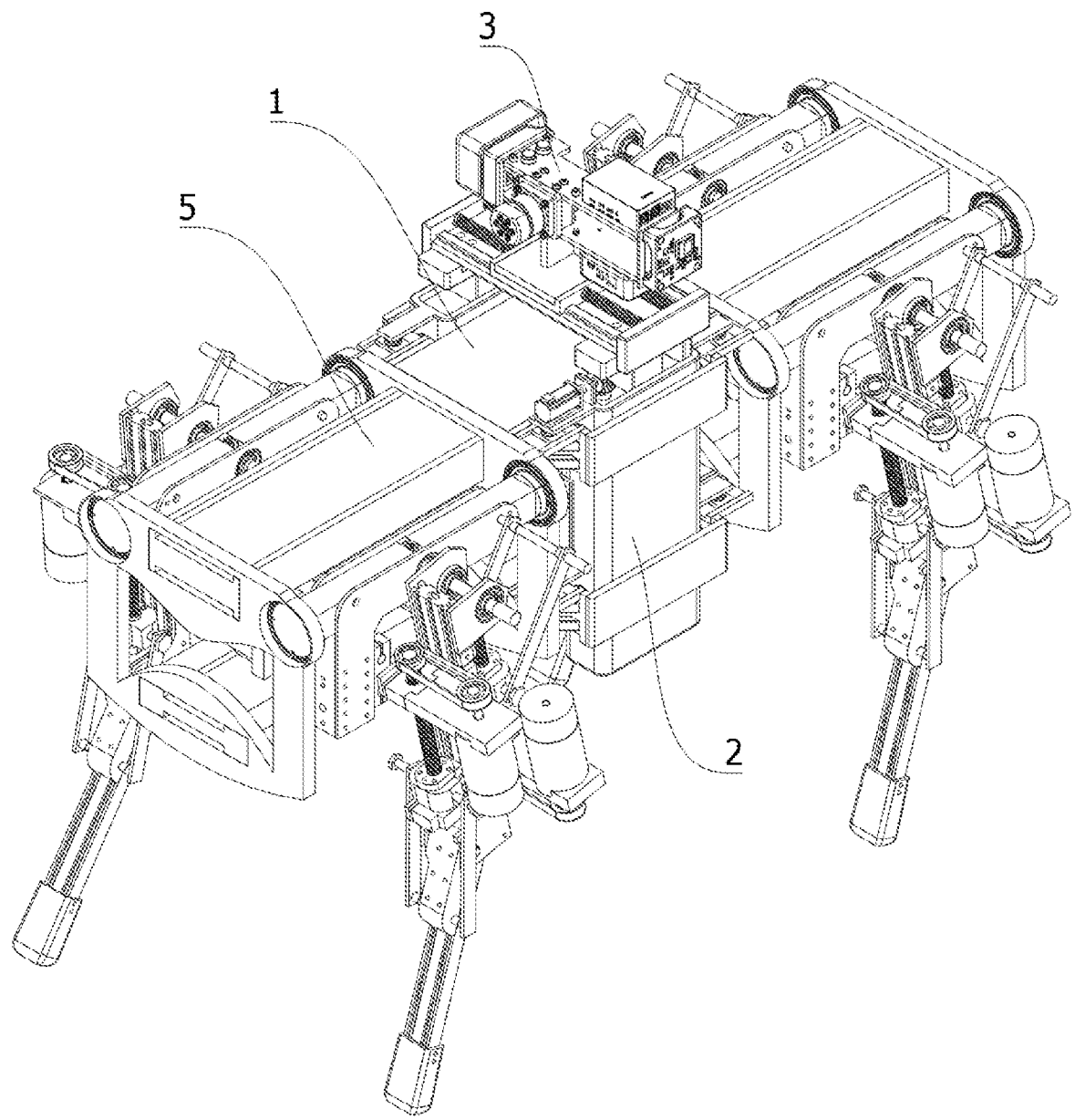
FIG. 1 is a schematic perspective view of a smart dog and a substation inspection device thereof.

1 Rack
11 Inertial sensor
2 Anti-vibration mechanism
21 First buffer assembly
211 Bracket
212 Extension plate
213 First elastic member
22 Second buffer assembly
221 Guide rail
222 Sliding seat
223 Right-angle pedestal
2231 Reinforcement rib
224 Second elastic member
23 Third buffer assembly
231 Sliding frame
232 Sliding rail
233 Third elastic member
3 Camera apparatus
31 First mounting seat
32 Camera assembly
33 Lifting assembly
331 Rotation driver
332 Screw rod
333 Bevel gear
4 Lock-stop apparatus
41 Second mounting seat
42 Locking block
421 Fourth elastic member
43 Docking plate
431 Locking groove
44 Control assembly
441 Linear driver
442 Pushing block
5 Mechanical dog

DETAILED DESCRIPTION

In order to understand features and technical solutions of the present application and specific objectives and functions achieved by the present application, the present application will be described below in conjunction with drawings and embodiments.

Figure 2:
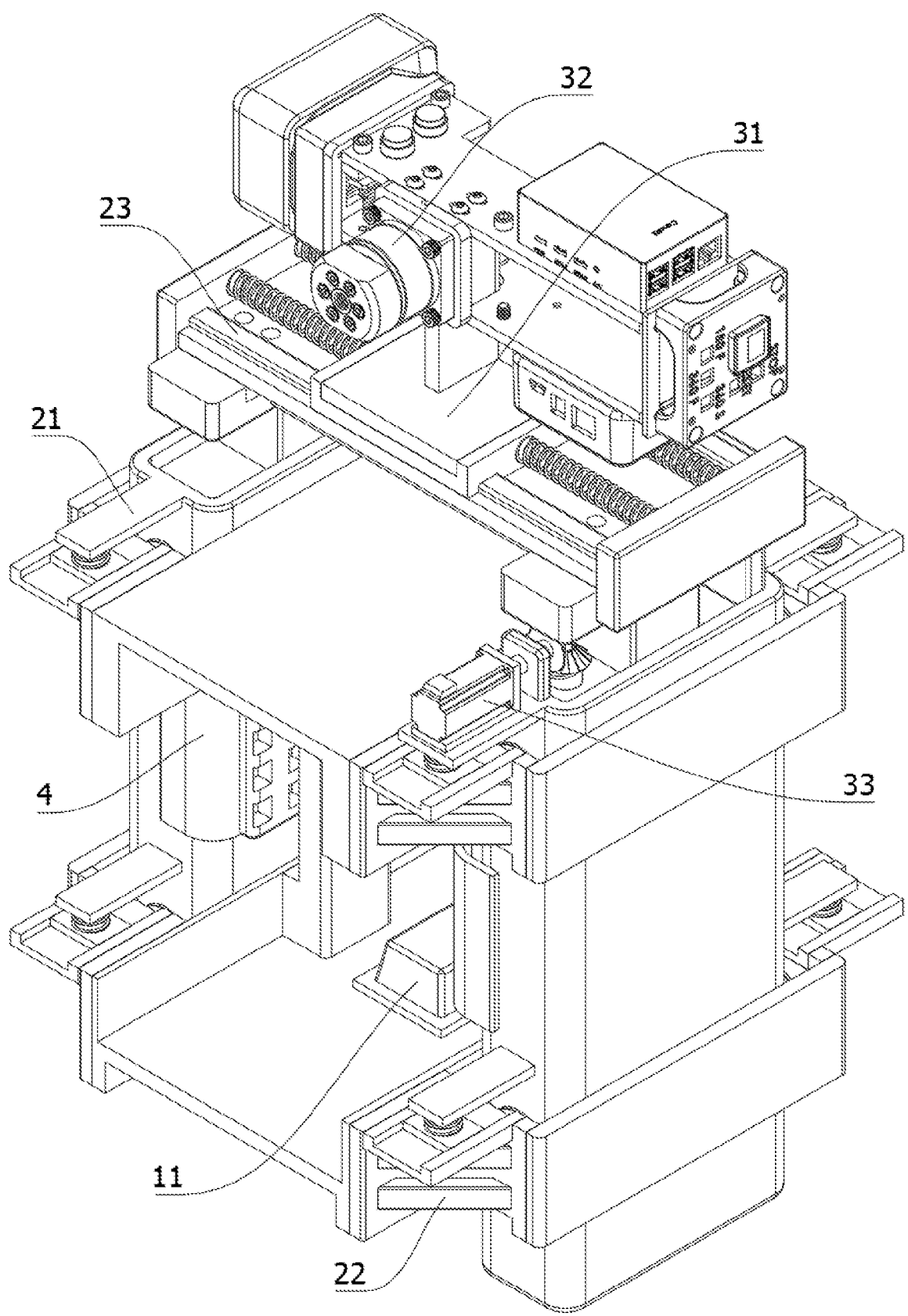
FIG. 2 is a schematic perspective view of a substation inspection device.
Figure 3:
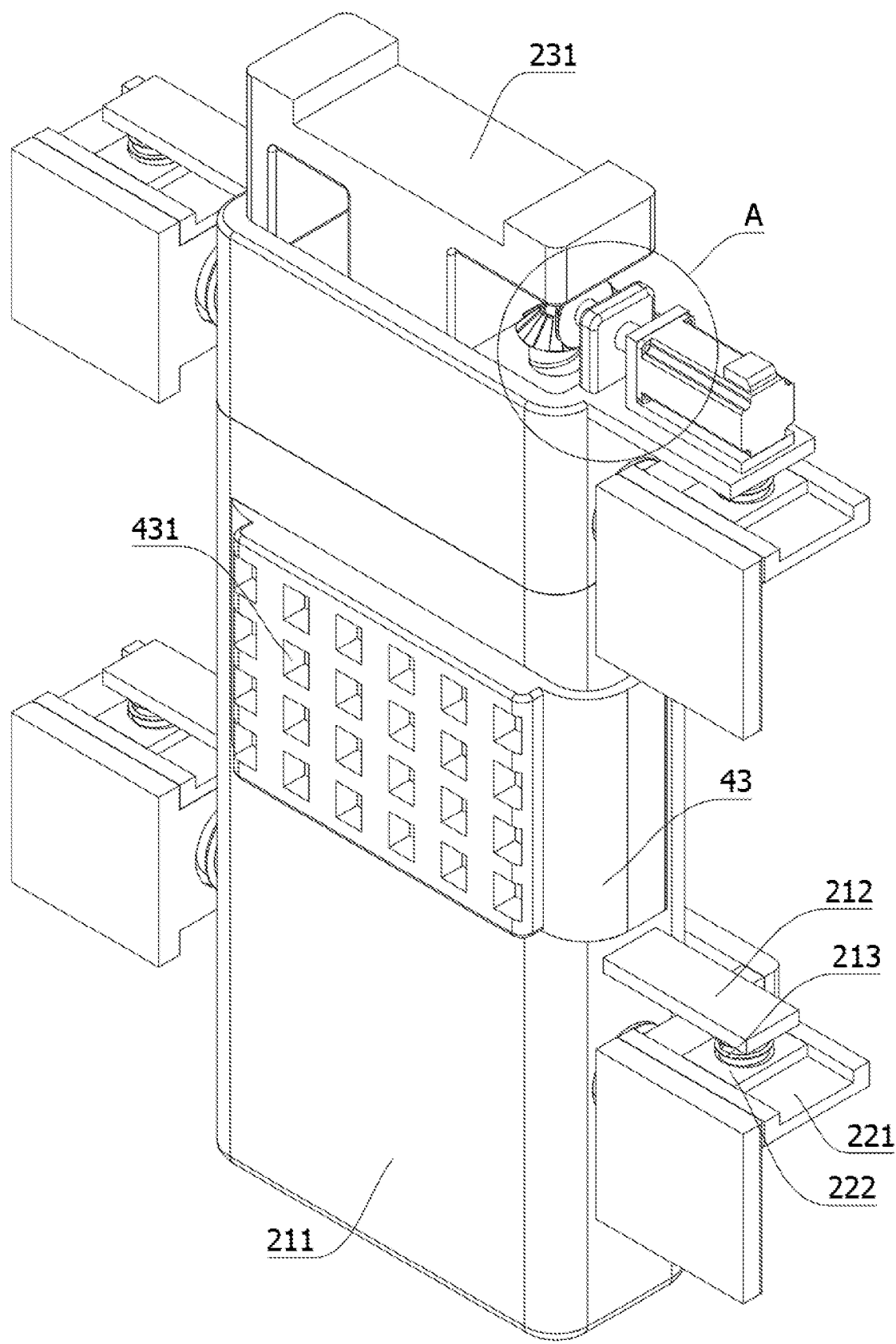
FIG. 3 is a schematic perspective view of an anti-vibration mechanism of a substation inspection device.
Figure 4:
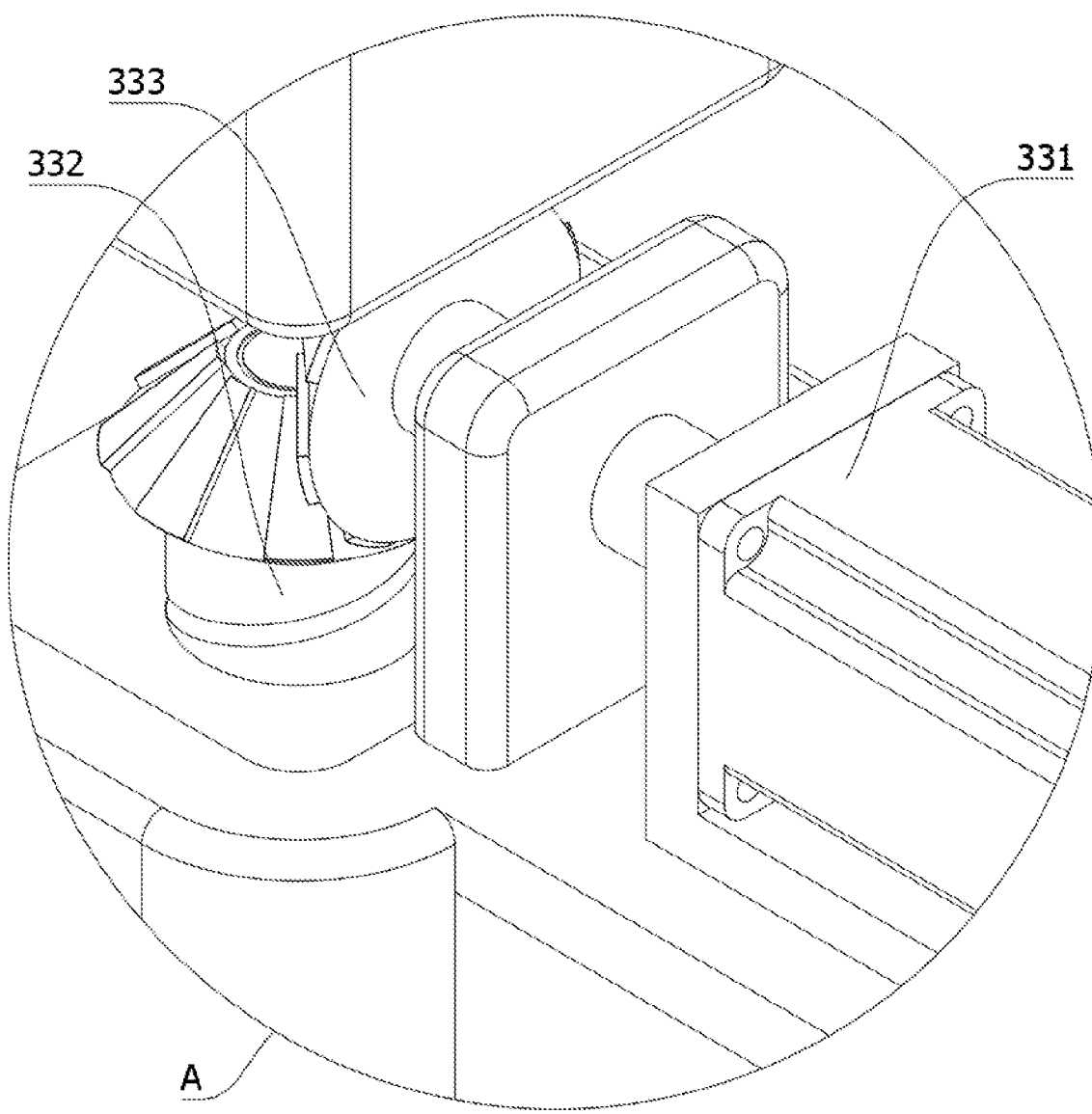
FIG. 4 is a partial enlarged schematic view of A in FIG. 3.

Referring to FIGS. 1 to 2, a substation inspection device with the vibration-proof performance (i.e., a substation intelligent inspection device) includes a mounting frame, an anti-vibration mechanism 2, a camera apparatus 3 and a lock-stop apparatus 4. The anti-vibration mechanism 2 is mounted on the mounting frame. The camera apparatus 3 includes a first mounting seat 31 and a camera assembly 32. The first mounting seat 31 is mounted on the mounting frame through the anti-vibration mechanism 2. The camera assembly 32 is mounted on the first mounting seat 31. The lock-stop apparatus 4 is mounted on the mounting frame and is configured to fix the camera apparatus 3.

A substation inspection device with the vibration-proof performance (i.e., a substation intelligent inspection device) includes a rack 1, an anti-vibration mechanism 2, a camera apparatus 3 and a lock-stop apparatus 4. The anti-vibration mechanism 2 is mounted on the rack 1. The camera apparatus 3 includes a first mounting seat 31 and a camera assembly 32. The first mounting seat 31 is mounted on the rack 1 through the anti-vibration mechanism 2. The camera assembly 32 is mounted on the first mounting seat 31. The lock-stop apparatus 4 is mounted on the rack 1 and is configured to fix the camera apparatus 3.

In the present application, a mechanical dog 5, the anti-vibration mechanism 2, the camera apparatus 3 and the lock-stop apparatus 4 are provided so that the function of reducing the vibration on the camera apparatus 3 is realized, and the lock-stop apparatus 4 is provided so that the effect of rapidly stabilizing the camera apparatus 3 is achieved. In this way, the definition of a shot image is improved, the shot image is prevented from being blurred, and a problem that a camera module of the inspection device is easily damaged due to vibrations is solved. The operator mounts the rack 1 on a mobile apparatus for moving, and the mobile apparatus may be the mechanical dog 5. The mechanical dog 5, the camera assembly 32 and the lock-stop apparatus 4 are electrically connected to a controller. During the movement of the rack 1, when the rack 1 encounters an obstacle, the rack 1 may bump or be impacted. When the rack 1 is impacted, a strong vibration is generated, and the vibration is absorbed and buffered through the anti-vibration mechanism 2, so that strong impact on the camera assembly 32 is prevented, and thus the camera assembly 32 is protected. When the rack 1 moves, since the camera assembly 32 is supported by the anti-vibration mechanism 2, the anti-vibration mechanism 2 may shake due to the continual buffering. When the shooting is performed in this case, a shot image may be blurred due to instability of a lens. Therefore, the lock-stop apparatus 4 is provided. After the rack 1 stops moving, the camera apparatus 3 shakes due to the inertia, and in this case, the controller sends a signal to the lock-stop apparatus 4, and the lock-stop apparatus 4 fixes the camera apparatus 3 after the lock-stop apparatus 4 receives the signal. The controller sends a signal to the camera assembly 32, the camera assembly 32 shoots a target object after the camera assembly 32 receives the signal, and images are transmitted for comparison, whereby the inspection function is achieved.

Referring to FIGS. 1 to 4, the anti-vibration mechanism 2 includes a first buffer assembly 21. The first buffer assembly 21 includes a bracket 211, extension plates 212 and first elastic members 213. The bracket 211 is slidably mounted on the rack 1. The first mounting seat 31 is mounted on the bracket 211. Two extension plates 212 are provided, and the two extension plates 212 are mounted on two sides of the bracket 211, respectively. Two first elastic members 213 are provided, and two ends of each of the two first elastic members 213 are connected to the rack 1 and a respective one of the two extension plates 212, respectively.

In the present application, the bracket 211, the extension plates 212 and the first elastic members 213 are provided so that the function of buffering in a vertical direction is realized, and the effect of reducing the impact on the camera apparatus 3 is achieved. When impacting, the rack 1 shakes, and further the bracket 211 and the first mounting seat 31 are driven to shake. In this case, the first elastic members 213 continuously contracts to buffer the impact, and mechanical energy is converted into heat energy to discharge. In this process, the energy is consumed, the vibration is absorbed, and thus the camera assembly 32 is prevented from being damaged. Furthermore, a hydraulic damping rod may be mounted at each of the first elastic members 213 to further absorb the vibration, improve the damping capacity, and rapidly stabilize the camera assembly 32.

Referring to FIGS. 1 to 5, the anti-vibration mechanism 2 further includes a second buffer assembly 22. The second buffer assembly 22 includes a guide rail 221, a sliding seat 222, a right-angle pedestal 223 and a second elastic member 224. The guide rail 221 and the right-angle pedestal 223 are mounted on the rack 1. The sliding seat 222 is slidably mounted on the guide rail 221. Two ends of each of the first elastic members 213 are connected to the sliding seat 222 and a respective one of the extension plates 212, respectively. Two ends of the second elastic member 224 are connected to the bracket 211 and the right-angle pedestal 223, respectively.

In the present application, the guide rail 221, the sliding seat 222, the right-angle pedestal 223 and the second elastic member 224 are provided so that the function of buffering along a horizontal direction is realized, thereby achieving the effect of reducing the impact on the camera assembly 32. When impacting, the rack 1 shakes, and further the bracket 211 and the first mounting seat 31 are driven to shake. In this case, the first elastic members 213 continuously contracts to buffer the impact, and mechanical energy is converted into heat energy to discharge. In this process, the energy is consumed, the vibration is absorbed. Moreover, the second elastic member 224 continuously contracts due to the impact, the sliding seat 222 slides back and forth along the guide rail 221. In this process, the energy is consumed, the impact of the first mounting seat 31 along the horizontal direction is reduced, and the camera assembly 32 is further prevented from being damaged.

Figure 5:
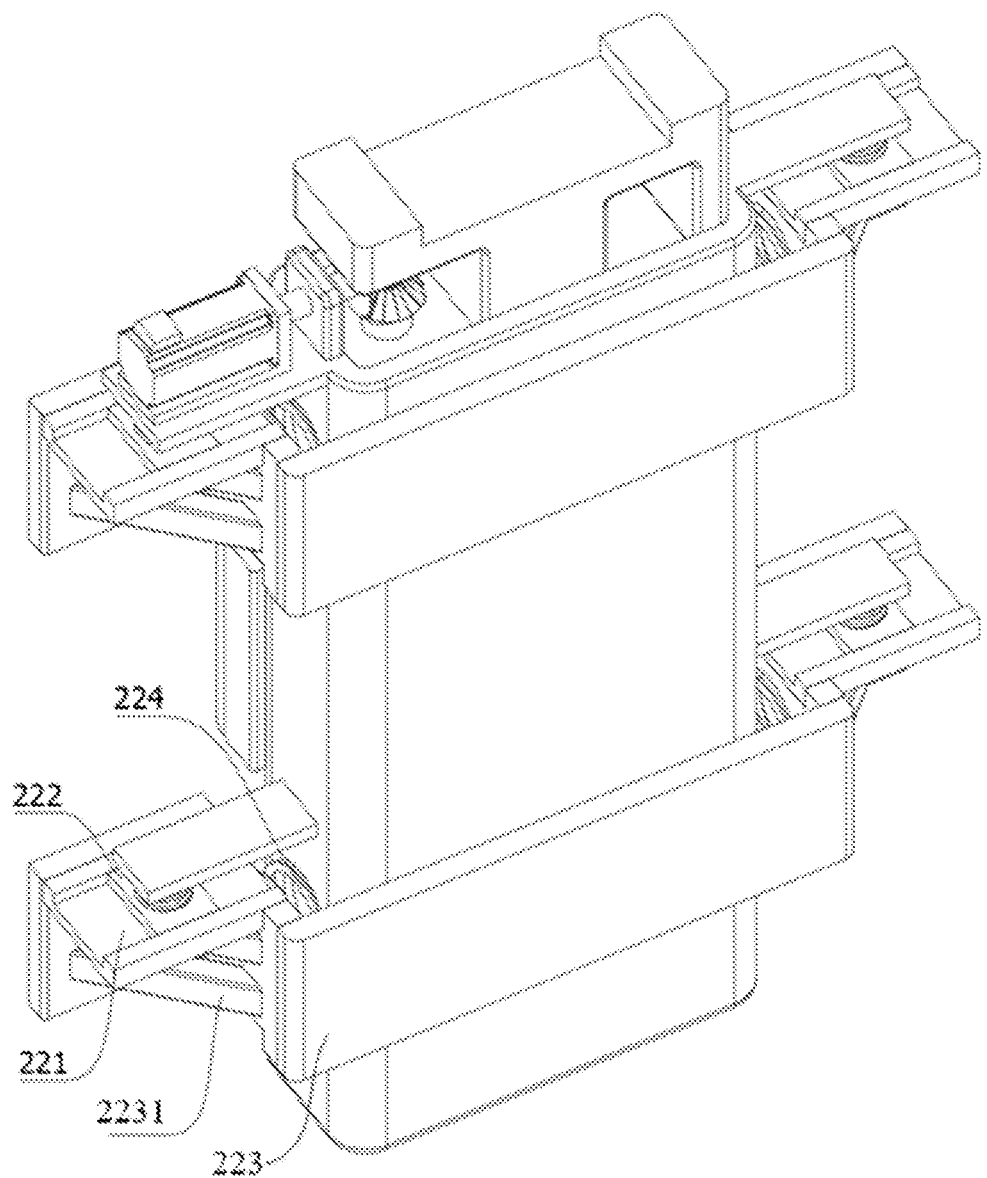
FIG. 5 is a schematic perspective view of another anti-vibration mechanism of a substation inspection device.
Figure 6:
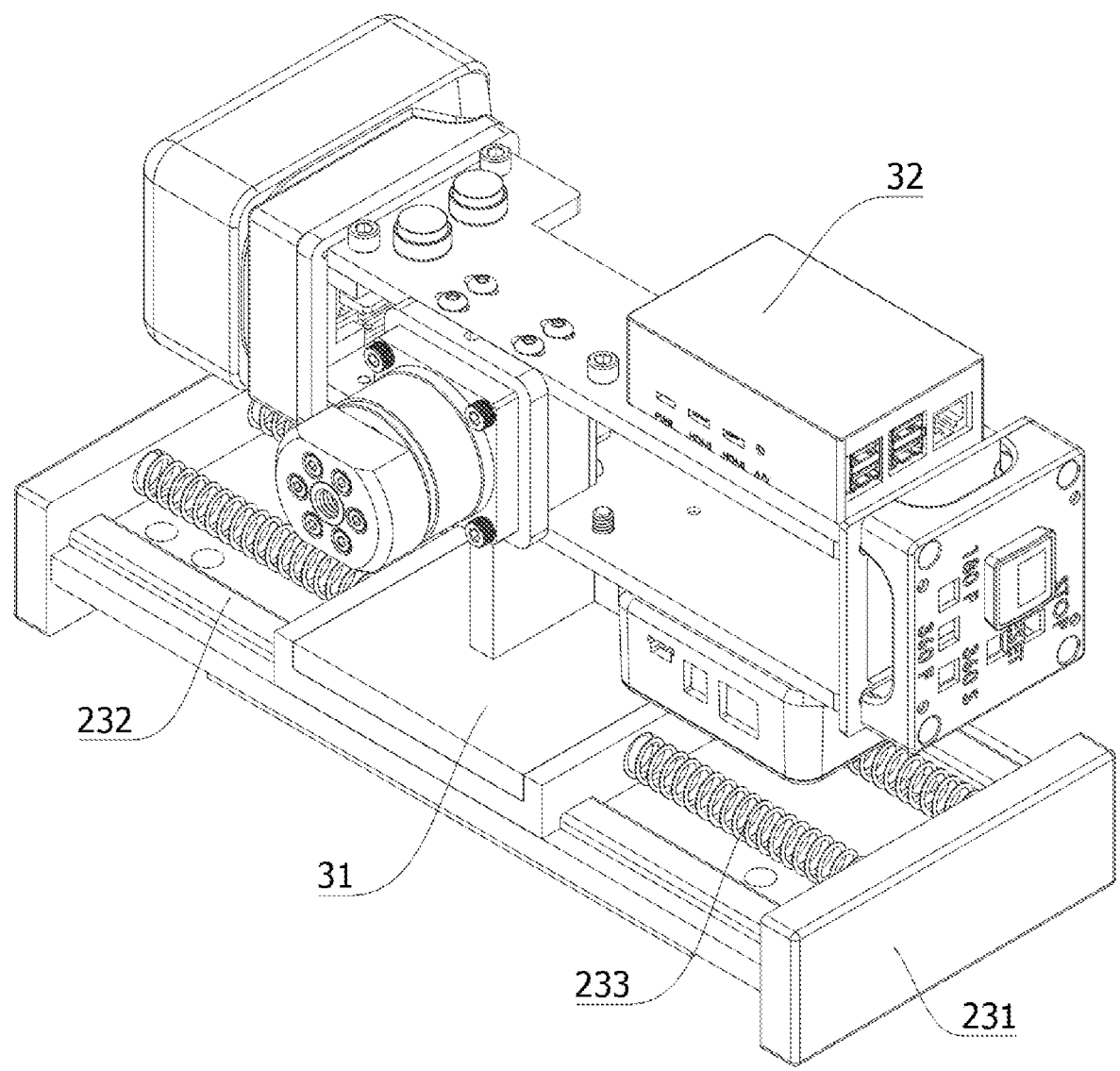
FIG. 6 is a schematic perspective view of a third buffer assembly and a camera assembly of a substation inspection device.

Referring to FIGS. 2, 5 and 6, the anti-vibration mechanism 2 further includes a third buffer assembly 23, where the third buffer assembly 23 includes a sliding frame 231, a sliding rail 232 and a third elastic member 233. The sliding frame 231 is mounted on the bracket 211, the sliding rail 232 is disposed on the sliding frame 231, the first mounting seat 31 is slidably mounted on the sliding rail 232, and two ends of the third elastic member 233 are connected to the first mounting seat 31 and the sliding frame 231, respectively.

In the present application, the sliding frame 231, the sliding rail 232 and the third elastic member 233 are provided so that the function of buffering along the horizontal direction is realized, thereby achieving the effect of supplementing the buffering range of the horizontal direction. When impacting, the rack 1 shakes, and further the bracket 211 and the first mounting seat 31 are driven to shake. In this case, the first elastic members 213 continuously contracts to buffer the impact, and mechanical energy is converted into heat energy to discharge. In this process, the energy is consumed, and the vibration is absorbed. Moreover, the second elastic member 224 continuously contracts due to the impact, the sliding seat 222 slides back and forth along the guide rail 221. In this process, the energy is consumed, and the impact of the first mounting seat 31 along the horizontal direction is reduced. In addition, the first mounting seat 31 slides along the sliding rail 232, the third elastic member 233 continuously contracts and deformed, so that the impact energy is consumed and thus the damage to the camera assembly 32 is further prevented.

With reference to FIGS. 2, 3, 7 and 8, the lock-stop apparatus 4 includes a second mounting seat 41, a locking block 42, a docking plate 43 and a control assembly 44. The second mounting seat 41 is mounted on the rack 1, the locking block 42 is slidably mounted on the second mounting seat 41, a fourth elastic member 421 is mounted on the locking block 42, and two ends of the fourth elastic member 421 are connected to the locking block 42 and the second mounting seat 41, respectively. The docking plate 43 is mounted on the bracket 211, the docking plate 43 is provided with at least two locking grooves 431 fitted with the locking block 42, and multiple locking grooves 431 are arranged in an array. The control assembly 44 is mounted on the rack 1 and is configured to control the locking block 42 to move.

In the present application, the second mounting seat 41, the locking block 42, the docking plate 43 and the control assembly 44 are provided so that the function of fixing the camera apparatus 3 is realized, thereby achieving the effects of rapidly stabilizing the camera assembly 32 and performing a shooting task. The control assembly 44 is electrically connected to the controller. When the rack 1 abruptly changes from a motion state to a static state to perform the shooting task, the camera assembly 32 may continue to shake for a period of time due to the inertia, and a shot image in the shaking process may be blurred or ghost. To prevent this, the lock-stop apparatus 4 is provided. When the shooting task is performed, the controller sends a signal to the control assembly 44, the control assembly 44 releases the restriction on the locking block 42, and the locking block 42 tends to extend out under the action of an elastic force of the fourth elastic member 421. If the locking block 42 does not correspond to any of the locking grooves 431 in position, then the locking block 42 is squeezed by the docking plate 43, the fourth elastic member 421 contracts, and the bracket 211 continuously moves along with the shaking of the camera assembly 32. When the locking block 42 is just aligned with the locking grooves 431, the locking block 42 slides into the locking grooves 431 under the action of the elastic force of the fourth elastic member 421, and the movement of the bracket 211 is limited by the fitting of the locking block 42 and the locking grooves 431, so that the shaking amplitude of the bracket 211 is reduced. In this way, the bracket 211 is prevented from continuously shaking, and the camera assembly 32 is stabilized.

Figure 7:
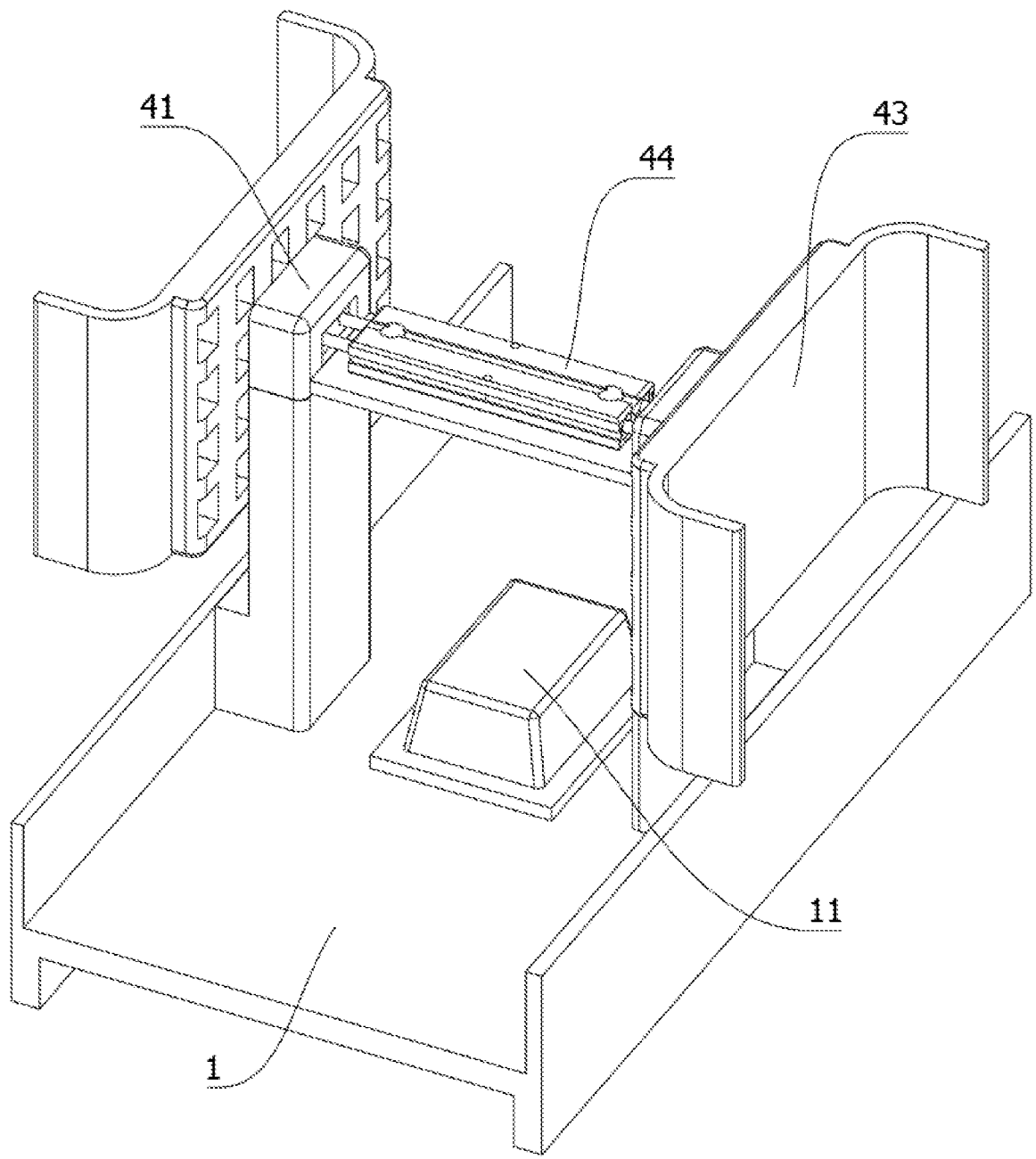
FIG. 7 is a schematic perspective view of a lock-stop apparatus of a substation inspection device.
Figure 8:
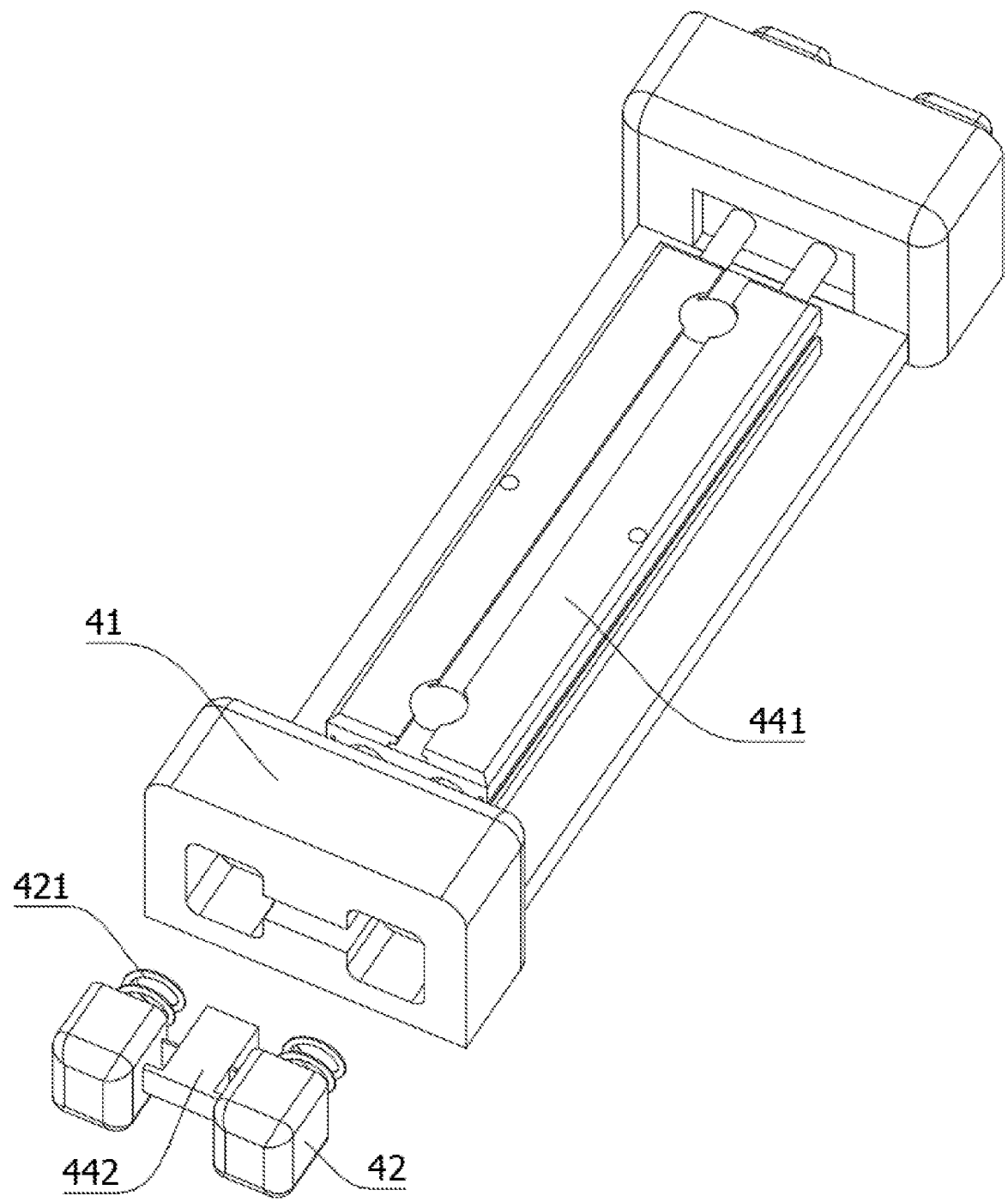
FIG. 8 is a schematic perspective exploded view of a lock-stop apparatus of a substation inspection device.

Referring to FIGS. 2, 7 and 8, the control assembly 44 includes a linear driver 441 and a pushing block 442. The pushing block 442 is slidably mounted on the second mounting seat 41, and the pushing block 442 is tightly fitted with the locking block 42. The linear driver 441 is mounted on the second mounting seat 41, and a drive end of the linear driver 441 is in transmission connection with the pushing block 442.

In the present application, the linear driver 441 and the pushing block 442 are provided so that the function of controlling the movement range of the locking block 42 is realized, thereby achieving the effect of controlling the start and stop of the lock-stop apparatus 4. The linear driver 441 may be a linear cylinder, and the linear driver 441 is electrically connected to the controller. During movement, the operator closes the lock-stop apparatus 4, the controller sends a signal to the linear driver 441, the linear driver 441 drives the pushing block 442 to slide after the linear driver 441 receives the signal, and the pushing block 442 pushes the locking block 42, so that the fourth elastic member 421 is in a retracted state. In this way, the locking block 42 is prevented from sliding out under the action of the elastic force. During shooting, the controller sends a signal to the linear driver 441, and the linear driver 441 drives the pushing block 442 to extend out, and further the limitation on the movement of the locking block 42 is released, so that the locking block 42 may slide into the locking grooves 431 under the action of the elastic force of the fourth elastic member 421.

Referring to FIGS. 1 5, the camera apparatus 3 further includes a lifting assembly 33. The lifting assembly 33 includes a rotation driver 331, a screw rod 332 and a bevel gear 333. The rotation driver 331 is mounted on the bracket 211, the screw rod 332 is rotatably mounted on the bracket 211 and is in a threaded connection with the sliding frame 231. Two bevel gears 333 are provided, the two bevel gears 333 are sleeved on the screw rod 332 and a drive end of the rotation driver 331, respectively; and the two bevel gears 333 are in a transmission connection.

In the present application, the rotation driver 331, the screw rod 332 and the bevel gears 333 are provided so that the function of driving the camera assembly 32 to raise and lower is realized, thereby achieving the effect of adjusting the shooting range. The rotation driver 331 may be a servo motor electrically connected to the controller. In order to improve the sensitivity of the shooting, the lifting assembly 33 is provided. The controller sends a signal to the rotation driver 331 according to the shooting position. And after the rotation driver 331 receives the signal, the screw rod 332 is rotated through the bevel gears 333, the screw rod 332 drives the sliding frame 231 in a threaded connection with the screw rod 332 to raise and lower, and the sliding frame 231 drives the first mounting seat 31 and the camera assembly 32 to move. In this way, the adjustment of the shooting height is completed, the shooting object is found more quickly and conveniently, and thus the inspection efficiency is improved.

Referring to FIGS. 1 to 5, the right-angle pedestal 223 is provided with a reinforcement rib 2231.

In the present application, the reinforcement rib 2231 is provided so that the function of improving the structural strength of the right-angle pedestal 223 is realized, thereby achieving the effect of improving the overall stability of the rack 1. Since the buffering of the bracket 211 relies on the right-angle pedestal 223, when the bracket 211 shakes, the right-angle pedestal 223 needs to support the bracket 211; therefore, the right-angle pedestal 223 is repeatedly subjected to a large pressure. For this reason, the reinforcement rib 2231 is disposed on the right-angle pedestal 223. By means of the support of the reinforcement rib 2231, the structural strength of the right-angle pedestal 223 is improved, and the bracket 211 is stably supported, the occurrence of fracture and the like is avoided, and further the stability of the support to the camera assembly 32 is improved.

Referring to FIGS. 1, 2 and 7, the rack 1 is mounted with an inertial sensor 11.

In the present application, the inertial sensor 11 is provided so that the function of monitoring the moving condition of the rack 1 is realized, thereby achieving the effect of automatically starting and closing the lock-stop apparatus 4 according to the moving condition of the rack 1, and reducing the manual labor intensity. The inertial sensor 11 is electrically connected to the controller. After the inspection device is started, the inertial sensor 11 monitors the movement condition of the rack 1 in real time and feeds back information to the controller. The controller automatically starts and closes the lock-stop apparatus 4 according to the information fed back by the inertial sensor 11, so that the automatic inspection can be achieved without manual intervention, and thus the intelligence degree of the inspection device is further improved.

Referring to FIG. 1, the present application further provides a smart dog. The smart dog includes a mechanical dog 5, and the mechanical dog 5 is mounted with a substation inspection device.

In the present application, the mechanical dog 5 is provided so that the function of automatic movement is achieved. The mechanical dog 5 may be a four-legged mechanical dog. Compared with the wheel type movement, the four-legged mechanical dog has a stronger obstacle-crossing capability and is more adaptive to complex terrain, thereby being able to adapt to more inspection tasks.

The present application has the following effects.
1. According to the present application, the mechanical dog, the anti-vibration mechanism, the camera apparatus, and the lock-stop apparatus are provided so that the function of reducing the vibration on the camera apparatus is realized, and the lock-stop apparatus is provided so that the effect of rapidly stabilizing the camera apparatus is achieved, thereby improving the definition of the shot image, preventing the shot image from being blurred, and solving the problem that the camera module of the inspection device is easily damaged due to vibrations.
2. According to the present application, the second mounting seat, the locking block, the docking plate and the control assembly are provided so that the function of fixing the camera apparatus is realized, thereby achieving the effects of rapidly stabilizing the camera assembly and performing the shooting task.
3. According to the present application, the linear driver and the pushing block are provided so that the function of controlling the movement range of the locking block is realized, thereby achieving the effect of controlling the start and stop of the lock-stop apparatus.

The above embodiments merely express one or more implementations of the present application, and the description thereof is specific and detailed, but should not be considered as limitations of the patent scope of the present application. On the premise of not departing from the concept of the present application, various variations and improvements may also be made, and all these variations and improvements fall within the scope of protection of the present application.

What is claimed is:
1. A substation intelligent inspection device with vibration-proof performance, comprising:

a rack, an anti-vibration mechanism, a camera apparatus and a lock-stop apparatus;

wherein the anti-vibration mechanism is mounted on the rack, wherein the camera apparatus comprises a first mounting seat and a camera assembly, the first mounting seat is mounted on the rack through the anti-vibration mechanism, and the camera assembly is mounted on the first mounting seat, wherein the lock-stop apparatus is mounted on the rack and is configured to fix the camera apparatus;

wherein the anti-vibration mechanism comprises a first buffer assembly, and the first buffer assembly comprises a bracket, extension plates and first elastic members;

wherein the bracket is slidably mounted on the rack, the first mounting seat is mounted on the bracket, two extension plates are provided and are mounted on two sides of the bracket respectively, and two first elastic members are provided;

wherein the anti-vibration mechanism further comprises a second buffer assembly, and the second buffer assembly comprises a guide rail, a sliding seat, a right-angle pedestal and a second elastic member;

wherein the guide rail and the right-angle pedestal are mounted on the rack, the sliding seat is slidably mounted on the guide rail, two ends of each of the two first elastic members are connected to the sliding seat and a respective one of the two extension plates respectively, and two ends of the second elastic member are connected to the bracket and the right-angle pedestal respectively;

wherein the anti-vibration mechanism further comprises a third buffer assembly, and the third buffer assembly comprises a sliding frame, a sliding rail and a third elastic member; and wherein the sliding frame is mounted on the bracket, the sliding rail is disposed on the sliding frame, the first mounting seat is slidably mounted on the sliding rail, and two ends of the third elastic member are connected to the first mounting seat and the sliding frame respectively.

2. The substation intelligent inspection device with vibration-proof performance of claim 1, wherein the lock-stop apparatus comprises a second mounting seat, a locking block, a docking plate and a control assembly;

wherein the second mounting seat is mounted on the rack, the locking block is slidably mounted on the second mounting seat, a fourth elastic member is mounted on the locking block, and two ends of the fourth elastic member are connected to the locking block and the second mounting seat respectively;

wherein the docking plate is mounted on the bracket, the docking plate is provided with at least two locking grooves fitted with the locking block, and the at least two locking grooves are arranged in an array; and wherein the control assembly is mounted on the rack and is configured to control the locking block to move.

3. The substation intelligent inspection device with vibration-proof performance of claim 2, wherein the control assembly comprises a linear driver and a pushing block, the pushing block is slidably mounted on the second mounting seat and is tightly fitted with the locking block, the linear driver is mounted on the second mounting seat, and a drive end of the linear driver is in transmission connection with the pushing block.

4. The substation intelligent inspection device with vibration-proof performance of claim 3, wherein the camera apparatus further comprises a lifting assembly, and the lifting assembly comprises a rotation driver, a screw rod and a bevel gear; and wherein the rotation driver is mounted on the bracket, the screw rod is rotatably mounted on the bracket, the screw rod is in a threaded connection with the sliding frame, two bevel gears are provided, the two bevel gears are sleeved on the screw rod and a drive end of the rotation driver respectively, and the two bevel gears are in transmission connection with each other.

5. The substation intelligent inspection device with vibration-proof performance of claim 1, wherein the right-angle pedestal is provided with a reinforcement rib.

6. The substation intelligent inspection device with vibration-proof performance of claim 1, wherein the rack is mounted with an inertial sensor.

7. A smart dog, comprising a mechanical dog, wherein the mechanical dog is mounted with a substation intelligent inspection device with vibration-proof performance, wherein the substation intelligent inspection device with vibration-proof performance comprises:

a rack, an anti-vibration mechanism, a camera apparatus and a lock-stop apparatus;

wherein the anti-vibration mechanism is mounted on the rack;

wherein the camera apparatus comprises a first mounting seat and a camera assembly, the first mounting seat is mounted on the rack through the anti-vibration mechanism, and the camera assembly is mounted on the first mounting seat, wherein the lock-stop apparatus is mounted on the rack and is configured to fix the camera apparatus;

wherein the anti-vibration mechanism comprises a first buffer assembly, and the first buffer assembly comprises a bracket, extension plates and first elastic members;

wherein the bracket is slidably mounted on the rack, the first mounting seat is mounted on the bracket, two extension plates are provided and are mounted on two sides of the bracket respectively, and two first elastic members are provided;

wherein the anti-vibration mechanism further comprises a second buffer assembly, and the second buffer assembly comprises a guide rail, a sliding seat, a right-angle pedestal and a second elastic member;

wherein the guide rail and the right-angle pedestal are mounted on the rack, the sliding seat is slidably mounted on the guide rail, two ends of each of the two first elastic members are connected to the sliding seat and a respective one of the two extension plates respectively, and two ends of the second elastic member are connected to the bracket and the right-angle pedestal respectively;

wherein the anti-vibration mechanism further comprises a third buffer assembly, and the third buffer assembly comprises a sliding frame, a sliding rail and a third elastic member; and wherein the sliding frame is mounted on the bracket, the sliding rail is disposed on the sliding frame, the first mounting seat is slidably mounted on the sliding rail, and two ends of the third elastic member are connected to the first mounting seat and the sliding frame respectively.

8. The smart dog of claim 7, wherein the lock-stop apparatus comprises a second mounting seat, a locking block, a docking plate and a control assembly;

wherein the second mounting seat is mounted on the rack, the locking block is slidably mounted on the second mounting seat, a fourth elastic member is mounted on the locking block, and two ends of the fourth elastic member are connected to the locking block and the second mounting seat respectively;

wherein the docking plate is mounted on the bracket, the docking plate is provided with at least two locking grooves fitted with the locking block, and the at least two locking grooves are arranged in an array; and wherein the control assembly is mounted on the rack and is configured to control the locking block to move.

9. The smart dog of claim 8, wherein the control assembly comprises a linear driver and a pushing block, the pushing block is slidably mounted on the second mounting seat and is tightly fitted with the locking block, the linear driver is mounted on the second mounting seat, and a drive end of the linear driver is in transmission connection with the pushing block.

10. The smart dog of claim 9, wherein the camera apparatus further comprises a lifting assembly, and the lifting assembly comprises a rotation driver, a screw rod and a bevel gear; and wherein the rotation driver is mounted on the bracket, the screw rod is rotatably mounted on the bracket, the screw rod is in a threaded connection with the sliding frame, two bevel gears are provided, the two bevel gears are sleeved on the screw rod and a drive end of the rotation driver respectively, and the two bevel gears are in transmission connection with each other.

11. The smart dog of claim 7, wherein the right-angle pedestal is provided with a reinforcement rib.

12. The smart dog of claim 7, wherein the rack is mounted with an inertial sensor.

* * * * *